United States Patent [19]

McCrea

[11] 3,959,704
[45] May 25, 1976

[54] SOLID STATE MOTOR STARTER AND OVERLOAD PROTECTOR CIRCUIT

[75] Inventor: Terrance Francis McCrea, Cocoa, Fla.

[73] Assignee: Fedders Corporation, Edison, N.J.

[22] Filed: Nov. 21, 1974

[21] Appl. No.: 526,030

[52] U.S. Cl............................ 318/387; 317/13 A; 318/415
[51] Int. Cl.² ........................................ H02H 7/08
[58] Field of Search .................... 318/387–391, 318/393–395, 400, 415; 317/13

[56] References Cited
UNITED STATES PATENTS

| | | | |
|---|---|---|---|
| 2,852,726 | 9/1958 | Ocnaschek...................... | 318/415 X |
| 3,845,354 | 10/1974 | Boothman et al. ........... | 317/13 A X |
| 3,900,781 | 8/1975 | Smith et al...................... | 318/387 X |
| 3,912,976 | 10/1975 | Sons et al......................... | 317/13 R |
| 3,912,993 | 10/1975 | Bereisa, Jr. ..................... | 318/415 X |

Primary Examiner—Robert K. Schaefer
Assistant Examiner—W. E. Duncanson, Jr.
Attorney, Agent, or Firm—Ryder, McAulay, Fields, Fisher & Goldstein

[57] ABSTRACT

A three-phase A.C. motor is connected to a three-phase A.C. supply through three sets of oppositely poled SCR's, one set being connected in each phase. Triggering pulses are supplied to the gates of the SCR's by triggering circuits. During starting of the motor, triggering circuits control the phases of the triggering pulses in relation to the phases of the supply in accordance with a ramp signal developed by the solid state starter circuit. The ramp signal increases the conduction angles of the SCR's until the motor has accelerated to running speed at which time maximum conduction of the SCR's is attained. The solid state starter circuit features closed loop control in generating the ramp. An overload protector circuit establishes different overload levels during starting and running of the motor and operates to terminate the application of triggering pulses to the SCR's if a motor overload condition is sensed during either starting or running.

9 Claims, 4 Drawing Figures

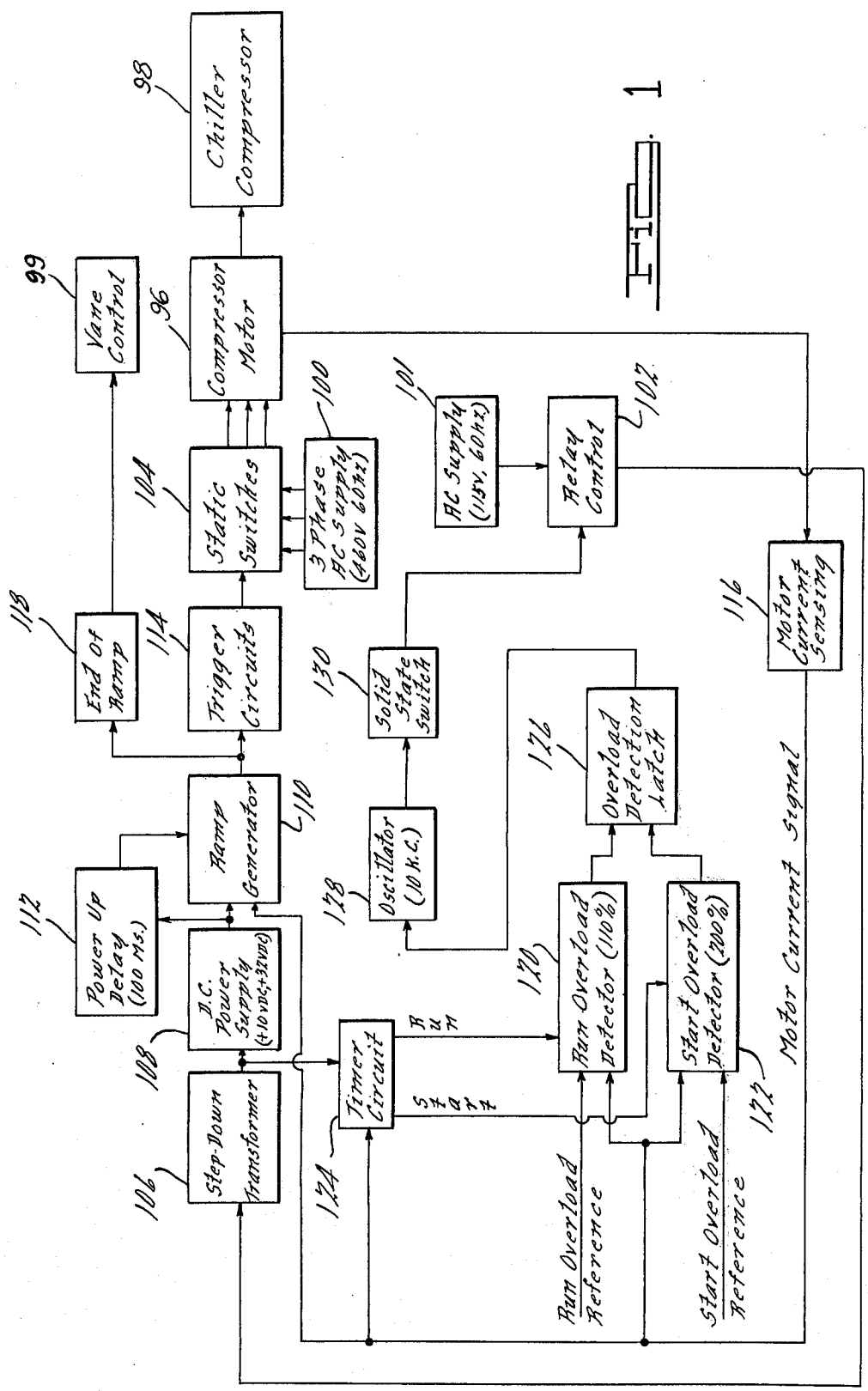

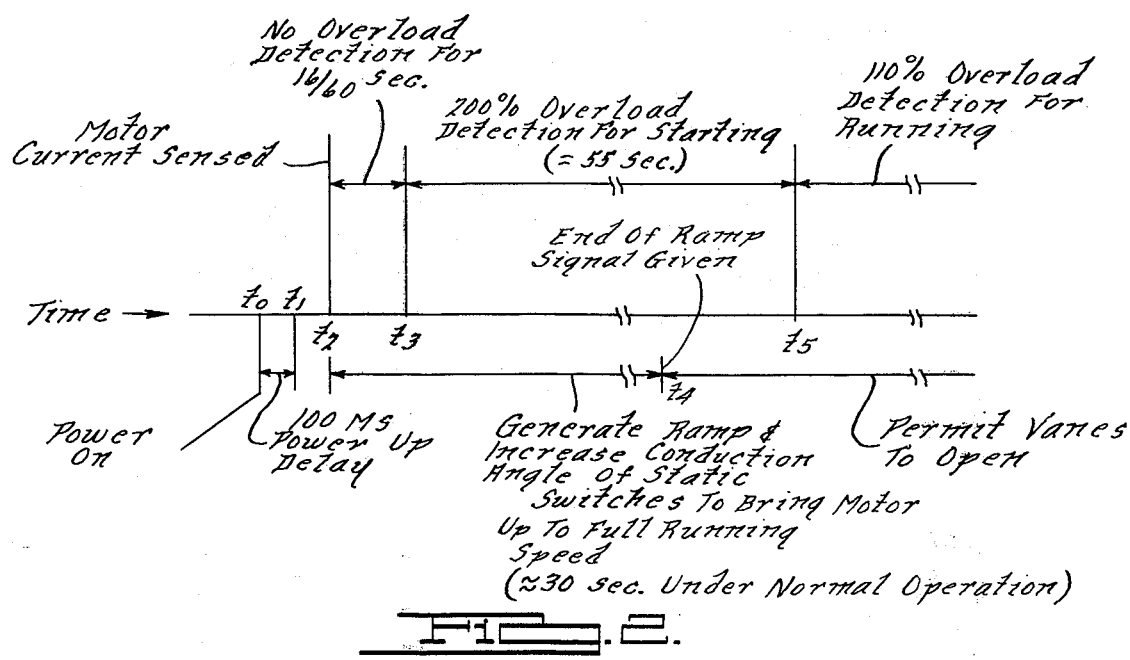

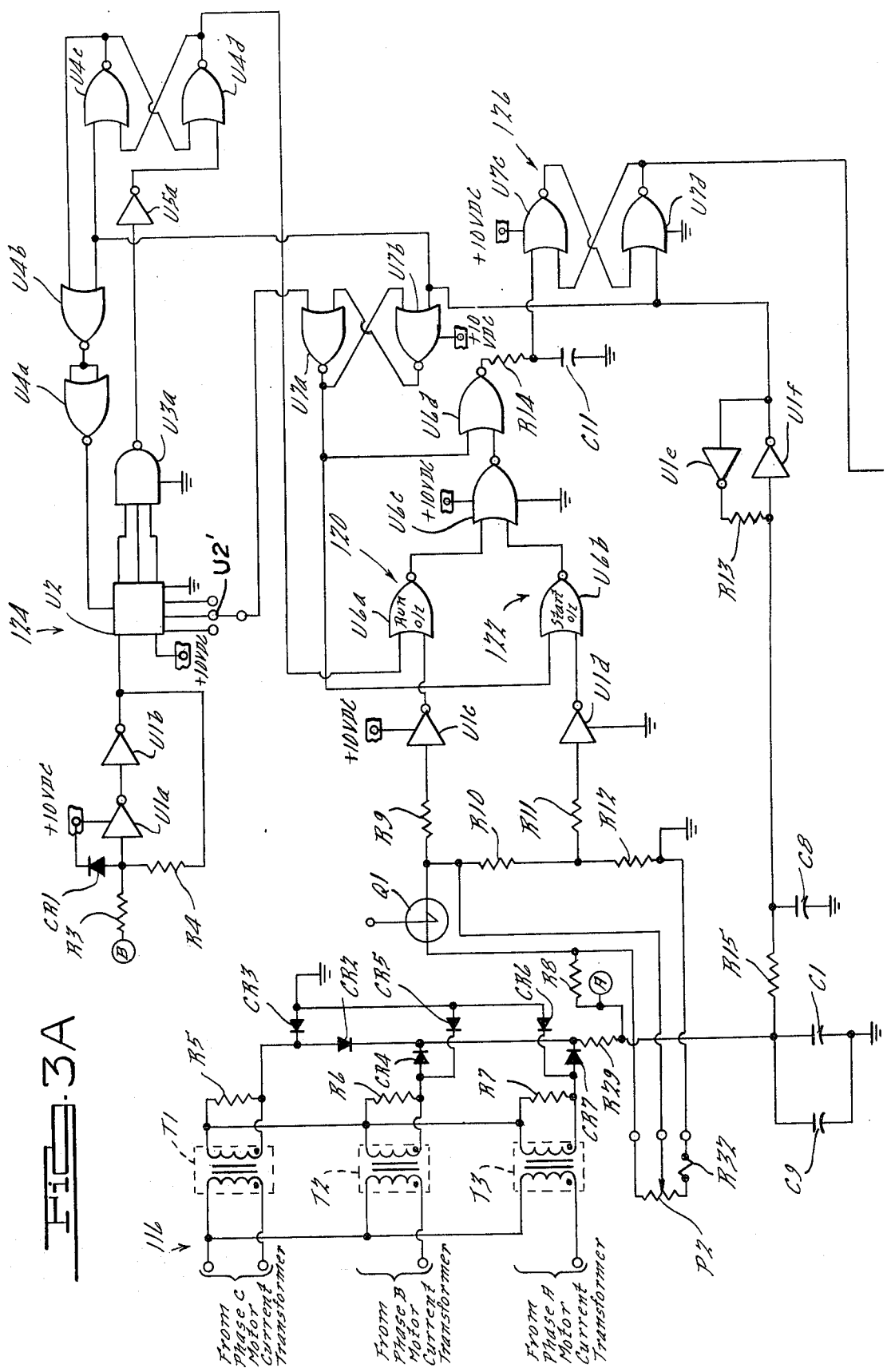

SOLID STATE MOTOR STARTER AND OVERLOAD PROTECTOR CIRCUIT

BACKGROUND AND SUMMARY OF THE INVENTION

This invention relates to A.C. motor control circuits and more specifically to a novel solid state starter and overload protector circuit for an A.C. motor.

The invention provides a system constructed from available electronic circuit components which accomplishes motor starting and overload protection functions in a novel and improved fashion. One feature of the invention resides in circuitry for generating a voltage ramp to effect motor starting. The ramp generating circuitry incorporates closed loop operation to achieve improved motor starting performance. Another feature of the invention resides in overload protection circuitry incorporating digital logic circuits which establish different motor overload levels during starting and running.

Additional features and attributes of the invention will be seen in the ensuing description and claims which are to be taken in conjunction with the accompanying drawings.

BRIEF DESCRIPTION OF THE DRAWINGS

The drawings illustrate a preferred embodiment of the invention according to the best mode present by contemplated in carrying out the invention.

FIG. 1 is a schematic diagram in block diagram form of a static starter and overload protector system embodying principles of the invention.

FIG. 2 is a timing diagram useful in explaining the operation of the system of FIG. 1.

FIGS. 3A and 3B illustrate an electrical schematic diagram of the system of FIG. 1 and should be considered together.

DESCRIPTION OF THE PREFERRED EMBODIMENT

Figure 3B:
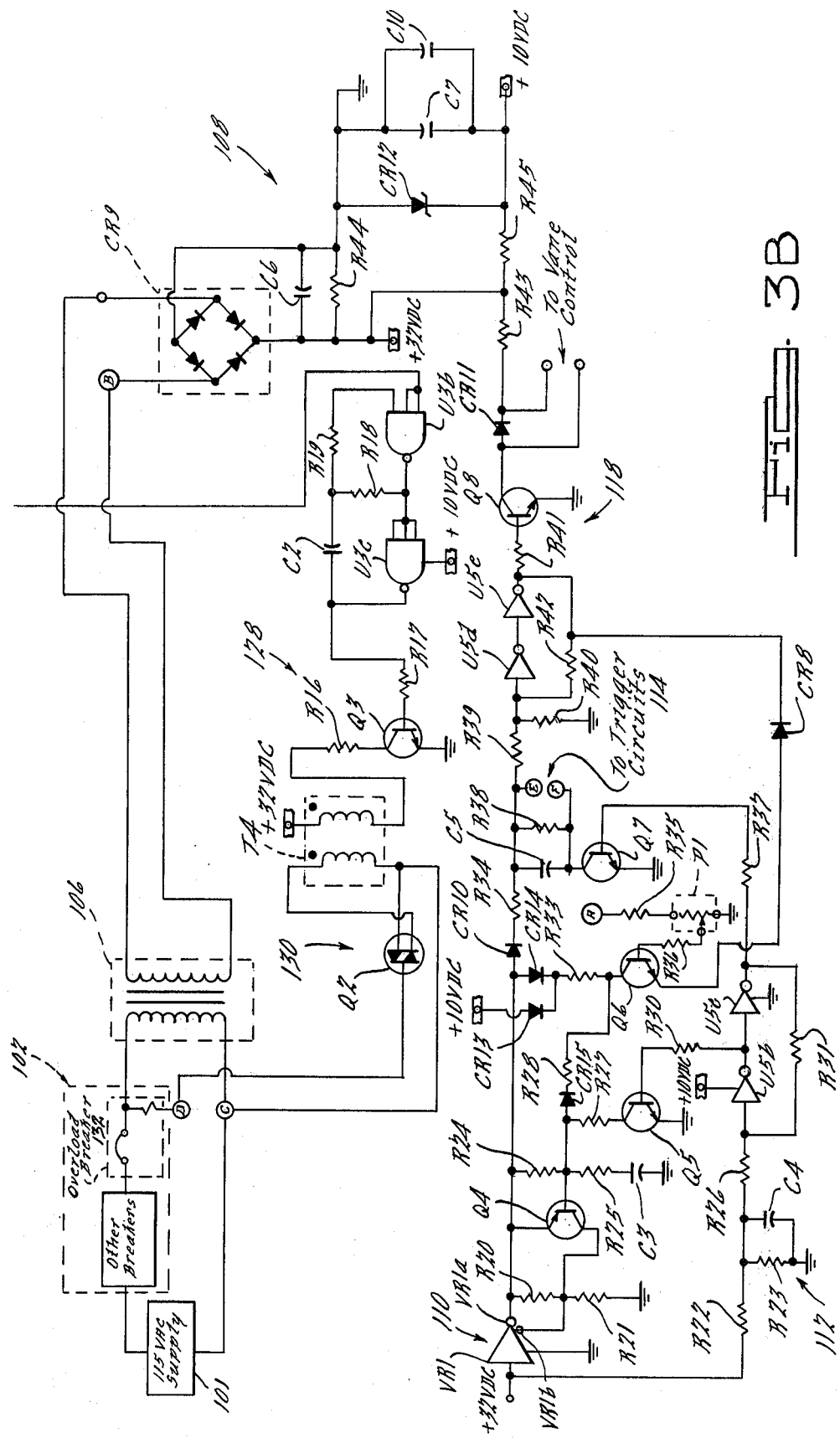

FIG. 1 illustrates in block diagram form the static starter and overload protector according to the present invention as applied to an A.C. compressor motor 96 which drives the compressor 98 of a chiller. Electrical power for compressor motor 96 is supplied from a three-phase A.C. supply 100 (for example, 460 VAC, 60 hz) through a bank of static switches 104. The bank of static switches contains three pairs of static (for example SCR's), each pair being connected in one of the three phase lines and the two switches of each pair being oppositely poled. The static starter of the present invention operates the bank of static switches 104 to regulate starting current drawn by the compressor motor from supply 100 during each half cycle of each voltage phase so that normal motor starting currents are not exceeded as the motor accelerates.

The static starter and overload protector circuitry is powered from a D.C. power supply 108 which is energized from an A.C. source 101 (for example, 115 VAC, 60 hz). A.C. source 101 is coupled to D.C. power supply 108 through a relay control 102 and a step down transformer 106. As will be explained in greater detail hereinafter, A.C. power from supply 101 is controllably applied by relay control 102 to transformer 106 to thereby controllably energize power supply 108. Briefly, when the compressor motor is running under a non-overload condition, relay control 102 permits power to be supplied; however, when an overload condition is detected, the overload protector of the present invention disconnects A.C. supply 101 from D.C. power supply 108 and shuts down compressor motor 96. D.C. power supply 108 develops the D.C. voltage level (or levels) used in the static starter and overload protector system (for example, +10 VDC and +32 VDC as in the present embodiment).

The static starter of the system includes a ramp generator circuit 110 which generates a voltage ramp used to start the compressor motor. The application of the +32 VDC potential from power supply 108 to ramp generator 110 permits ramp generator 110 to develop the voltage ramp output. In order to assure that the D.C. potentials of power supply 108 have had ample time to stabilize after power supply 108 has been energized from A.C. supply 101, a power-up delay circuit 112 is connected between power supply 108 and ramp generator 110 to inhibit operation of the latter for a given delay period (for example, approximately 100 millisecond delay as in the present embodiment). The output of ramp generator 110 is coupled to three identical sets of trigger circuits 114. The output circuitry of each trigger circuit is operatively coupled with a corresponding pair of static switches 104. Briefly, each trigger circuit supplies phased trigger pulses to the corresponding pair of static switches to cause the latter to conduct current to the compressor motor. At starting of the compressor motor these trigger pulses are phased in relation to the three phase A.C. supply 100 such that the static switches conduct for only a limited portion of each half cycle to thereby limit the starting current drawn by the compressor motor. The output voltage ramp of ramp generator 110 causes the phase of the trigger pulses to change so that the static switches become increasingly conductive for an increasing portion of each half cycle as the ramp is generated. When the ramp attains its maximum value, the phase of the trigger pulses is such that the static switches exhibit maximum conduction thereby connecting the three-phase A.C. supply 100 to the compressor motor for essentially the full duration of each half cycle. A suitable triggering circuit is available from Vectrol, Inc., Rockville, Md. The current drawn by the motor is monitored by a motor current sensing circuit 116 which provides a motor current signal to ramp generator 110. This motor current signal is used in developing the ramp output of ramp generator 110, and, hence, it will be observed that a closed loop type of system is provided. In this manner, the static starter operates to bring the compressor motor up to running speed without exceeding allowable motor starting currents.

An end-of-ramp circuit 118 is also operatively coupled to the output of ramp generator 110 and gives an output signal at the termination of the ramp. Circuit 118 serves to interlock the chiller vane control 99 of the chiller so that the chiller vanes cannot be opened until the ramp terminates. This assures that the compressor motor is running at full speed before it is brought under load.

The remainder of FIG. 1 constitutes the overload protector of the present invention which serves to disconnect A.C. supply 100 from the compressor motor should a motor overload be detected. Importantly, according to one aspect of the invention, the overload protector is integrated with the static starter so that different overload levels are established during starting and running. The motor current signal developed by motor current sensing circuit 116 is also supplied to both a run overload detector circuit 120 and a start overload detector circuit 122 as well as to a timer circuit 124. A run overload reference signal is supplied to run overload detector 120 while a start overload reference signal is supplied to start overload detector 122. Timer circuit 124 supplies timed output signals in the form of a run signal to run overload detector 120 and a start signal to start overload detector 122. The respective outputs of circuits 120 and 122 are supplied to an overload detection latch circuit 126. The output of latch circuit 126 is connected to an oscillator circuit 128 and in turn a solid state switch 130 and relay control 102. Briefly, if either of the overload detector circuits 120, 122 detects an overload condition, overload detection latch 126 is switched from an unlatched to a latched condition to thereby cause oscillator 128 to begin oscillating at a relatively high frequency in comparison to the frequency of the A.C. supply, (for example, 10 khz). The high frequency oscillations from oscillator 128 are used to trigger solid state switch 130 which in turn causes relay control 102 to disconnect the A.C. supply 101 from D.C. supply 108 and in turn prevent the static switches 104 from conducting current to the compressor motor. Hence, when an overload condition is detected by either overload detector circuit 120, 122, the compressor motor is shut down.

Timer circuit 124 serves to gate the respective overload detectors 120, 122 during starting and running. The timing base is derived from the A.C. output of transformer 106 which is at 60 hz. As soon as motor current is sensed by motor current sensing circuit 116, timer circuit 124 begins timing. For a very short instant (for example, 16/60 second as in the present embodiment) neither the start signal nor the run signal is generated thereby precluding any overload detection during this instant. This is desirable in avoiding unwanted shut-down of the motor which might otherwise occur because of any momentary high starting current transients. The interval is, however, sufficiently short that damage is avoided if a true overload condition exists. Immediately thereafter, a start signal is supplied to start overload detector 122 to enable start overload detector 122 to detect an overload condition. The start signal continues for the duration of the motor starting period (about 55 seconds in the present embodiment). At the conclusion of the motor starting period, the start signal is terminated and concurrently the run signal is supplied to run overload detector 120 enabling the latter to now detect an overload condition. However, the respective overload conditions for which the two overload detectors 120, 122 are set differ. Run overload detector 120 is responsive to a lower overload level than is start overload detector 122. For example, as in the present embodiment, the start overload detector 122 is responsive to any overload which exceeds 200 percent of the rated compressor motor full load current while run overload detector 120 is responsive to any overload which exceeds 110 percent of full load compressor motor current. In this manner, higher motor currents are permitted during the motor starting period with lower motor currents being thereafter permitted during normal running of the motor.

FIG. 2 illustrates a timing diagram which is useful in summarizing the overall system operation as explained above. At a time $t_0$ power is turned on thereby supplying 115 VAC to step down transformer 106 and energizing D.C. power supply 108. The power up delay on the order of 100 milliseconds follows and terminates at the time $t_1$. Now, trigger pulses are supplied from trigger circuits 114 to cause limited conduction of static switches 104 sufficient to cause the compressor motor to accelerate. Current drawn by the compressor motor is sensed by motor circuit sensing current 116 and the motor current signal-generated by circuit 116 at time $t_2$ starts timer circuit 124. For a very short period thereafter (i.e., 16/60 second) timer circuit 124 generates neither the run signal nor the start signal. At time $t_3$ timer circuit 124 generates the start signal which enables start overload detector 122 to detect overloads amounting to more than 200 percent rated full load motor current. The start signal continues to be generated for a duration long enough to permit the motor to accelerate to full speed under normal operating conditions, (about 55 seconds in the illustrated system). Under normal starting the motor will accelerate to full speed in about 30 seconds so that the time $t_4$, at which the motor attains full speed, will be somewhat in advance of the time $t_5$, at which time, timer circuit 124 terminates the start signal and generates the run signal. Upon being generated, the run signal enables run overload detector circuit 120 to detect motor overloads amounting to more than 110 percent rated full load motor current. This condition ensues as long as the motor continues to draw normal operating current during its desired operating period. During the time interval $t_2$ through $t_4$ (about 30 seconds), ramp generator circuit 110 is generating the ramp voltage signal which causes increasing conduction of the static switches and, hence, gradually increases the voltage applied to the compressor motor as the motor is being accelerated. The ramp terminates at time $t_4$ and end of ramp circuit 118 at this time allows the chiller vanes to open thereby permitting the motor to come under load.

A detailed schematic diagram of a portion of the system shown in FIG. 1 is shown in FIGS. 3A and 3B which should be considered together. The schematic contains individual circuits whose specific values can be selected in accordance with known design techniques in light of the ensuing detailed description of the schematic. At the upper left hand corner of FIG. 3B, A.C. supply 101 is coupled through relay control 102 to the primary of step-down transformer 106. Relay control 102 is illustrated as comprising a number of circuit breakers which monitor various operating parameters of the chiller system and which operate to interrupt power from supply 101 to transformer 106 when an undesired condition of any of the parameters occurs. One of these circuit breakers is designated as overload breaker 132 and this particular circuit breaker is operatively coupled with the overload protector of the present invention to break the connection between supply 101 and transformer 106 when the overload protector senses an overload in the compressor motor as will be explained in greater detail hereinafter.

The secondary of transformer 106 is coupled to power supply 108 which comprises a full wave rectifying diode bridge CR9 connected across the secondary of transformer 106 to provide across a capacitor C6 and a resistor R44, a 32 volt D.C. potential of positive polarity relative to ground. A dropping resistor R45 is connected in series with the parallel combination of a zener diode CR12 and two capacitors C7 and C10 to provide a 10 volt D.C. potential of positive polarity.

These two D.C. potentials are supplied to the various electronic circuit elements shown in FIGS. 3A and 3B, such as inverters, NAND gates, NOR gates, etc. (It will be appreciated that since many of these individual elements are contained on common circuit modules, the D.C. potentials are illustrated as being supplied to only certain ones of the circuit elements.)

Ramp generator 110 is shown near the lower left-hand corner of FIG. 3B and includes a voltage regulator VR1 whose input is connected to the 32 volt D.C. potential. The output of regulator VR1 is taken between terminals VR1$a$ and VR1$b$. Briefly, regulator VR1 is a circuit device which provides a voltage signal between its output terminals VR1$a$, VR1$b$ whose magnitude is a function of the value of the impedance externally connected to those terminals. A suitable device for regulator VR1 is Motorola's MFC6040A. In the present embodiment, a resistor R20 is connected between terminals VR1$a$ and VR1$b$ and a second resistor R21 is connected between terminal VR1$b$ and ground. The emitter-collector circuit of a PNP transistor transistor Q4 is connected across the output of regulator VR1 with the emitter being connected to terminal VR1$a$ and the collector to terminal VR1$b$. These circuit elements cooperate to generate a ramp voltage in the form of a positively increasing voltage output as measured at terminal VR1$a$ with respect to ground. This is accomplished by progressively decreasing conduction of transistor Q4 thereby progressively increasing the external impedance across terminals VR1$a$ and VR1$b$ of voltage regulator VR1 and, hence, progressively raising the potential of VR1$a$.

The conduction of transistor Q4 is determined by three input circuits connected to its base terminal. One of these three input circuits includes a transistor Q5 whose emitter-collector connects through a resistor R27 to the base of transistor Q4; this input circuit is responsive to power-up delay circuit 112 and operates to force transistor Q4 into conduction during the power-up delay so as to maintain a constant potential at terminal VR1$a$ during the delay. A second input circuit for transistor Q4 is operatively coupled with motor current sensing circuit 116 to vary the base current in transistor Q4 in accordance with the compressor motor current. This second input circuit operates to cause generation of the ramp and includes a diode CR15 and a resistor R28 connected in series from the base of transistor Q4 to the collector of a transistor Q6. The collector of transistor Q6 is coupled through a resistor R33 and a diode CR13 to the 10 volt D.C. potential while resistor R33 is also coupled through a diode CR14 to terminal VR1$a$. Because the ramp at terminal VR1$a$ begins at only around a four volt potential, the design insures that the collector of transistor Q6 is biased to a 10 volt potential until the ramp output at terminal VR1$a$ begins to exceed such a potential. The base circuit of transistor Q6 is coupled with motor current sensing circuit 116 via the terminal designated A (see FIG. 3A). As will be explained in greater detail in connection with the description of FIG. 3A, the signal at terminal A is proportional to the magnitude of compressor motor current. This signal is scaled through resistor R35 and a pre-set calibration potentiometer P1 to provide appropriate attenuation at the base of transistor Q6. Basically, the conductivity of transistor Q6 is used to vary the conductivity of transistor Q4 and thereby generate the ramp signal at terminal VR1$a$. Potentiometer P1 is preset to adjust the gain of the motor current signal which is fed back to the ramp generator. The gain of the feedback signal is set such that for a nominal motor starting current, the magnitude of the ramp increases at a rate which increases the conduction angles of the SCR's 104 so that the nominal motor starting current will be maintained until full speed is reached. Under normal starting, the ramp will bring the motor to full speed well within the starting time during which the overload protector allows the larger starting current magnitude. Since negative feedback is provided, excessive motor current will decrease the slope of the ramp. The third input circuit connected to the base of transistor Q4 is a limiter which consists of a resistor R24, a resistor R25 and a capacitor C3 connected as illustrated. The purpose of this limiter is to limit the rate of change of conduction of transistor Q4 to a predetermined maximum and thereby in turn limit the rate of change of the voltage ramp.

Continuing further with the description of ramp generator 110, terminal VR1$a$ is coupled through a diode CR10 and a dropping resistor R34 to the parallel combination of a capacitor C5 and a resistor R38. Capacitor C5 and resistor R38 are in turn coupled through the emitter-collector circuit of a transistor Q7 to ground. As will be seen later, transistor Q7 is coupled with power-up delay circuit 112 and can conduct only after the power-up delay has occurred. The output voltage ramp, which is developed by circuit 110 and supplied to trigger circuits 114, is taken across capacitor C5 and resistor R38 at terminals designated E and F. The voltage ramp developed across terminals E and F represents essentially an attenuated version of the ramp signal developed at terminal VR1$a$. Because transistor Q7 is prevented from conducting during the power-up delay, essentially a zero potential signal is supplied to the trigger circuits until the power-up delay has elapsed. After this time transistor Q7 becomes fully conductive to permit changing of capacitor C5 and the ensuing generation of the output voltage ramp to trigger circuits 114.

Power-up delay circuit 112 is shown generally at the lower left-hand portion of FIG. 3B and includes resistors R22 and R23 and a capacitor C4 connected as illustrated across the 32 volt D.C. supply. This circuit exhibits a certain time constant which determines the duration of the power-up delay and which is provided by the charging of capacitor C4 after the 32 volt supply is energized. The voltage developed across capacitor C4 is supplied through a dropping resistor R26 to the input of an inverter U5$b$. The input of a second inverter U5$c$ is connected to the output of the first inverter U5$b$ and a feedback resistor R31 is connected from the output of inverter U5$c$ to the input of inverter U5$b$. The output of the first inverter U5$b$ is also coupled through a resistor R30 to the base of transistor Q5 while the output of the second inverter U5$c$ is coupled through a resistor R37 to the base of transistor Q7. The two transistors Q5, Q7 provide the output signals of power up delay circuit 112 to inhibit operation of ramp generator circuit 110 until the imposed delay has elapsed. Each inverter U5$b$, U5$c$ provides a logical output signal which is the inverse of the logical input signal applied to it. Hence, when a high signal is applied to the input of an inverter, its output is low and vice-versa. Therefore, when D.C. power supply 108 is off (i.e., not energized), both the 10 volt and 32 volt potentials are absent and neither transistor Q5 nor Q7 can conduct. However, when power supply 108 is turned on, the 10 volt D.C. potential is supplied to inverters U5b, U5c and the 32 volt potential is supplied to the input of power-up delay circuit 112 to begin charging capacitor C4. Because of the delay imposed by capacitor C4, it will happen that initially the output of inverter U5b will be high and the output of inverter U5c low. In this condition, transistor Q5 is rendered conductive while transistor Q7 is rendered non-conductive. The power-up delay terminates when the voltage developed across capacitor C4 reaches a magnitude sufficient to apply a high input signal to inverter U5b. When this happens, the output of inverter U5b switches from high to low thereby rendering transistor Q5 nonconductive and the output of inverter U5c switches from low to high rendering transistor Q7 conductive. The feedback connection of resistor R31 provides a slight hysteresis characteristic which is desirable in the switching operation. Hence, power-up delay circuit 112 provides control signals via transistors Q5 and Q7 which delay the output of ramp generator 110 during initial start up.

The end of ramp detector circuit 118 includes resistors R39 and R40 which are connected as illustrated across the output of the ramp generator. The signal across resistor R40 is supplied to the input of an inverter U5d. The output of inverter U5d is supplied to a further inverter U5e whose output is connected via a feedback resistor R42 to the input of inverter U5d. The output of inverter U5e also feeds through a resistor R41 to the base of a transistor Q8 which provides the signal for the chiller vane control. The emitter-collector circuit of transistor Q8 connects through a diode CR11 and a resistor R43 across the 32 volt D.C. supply. Prior to the beginning of the output ramp from ramp generator 110, the input signal to inverter U5d is low and, hence, the output signal of inverter U5e is also low. This causes transistor Q8 to be non-conducitve and, hence, no signal is supplied to the vane control. When the ramp reaches its maximum value the magnitude of the input signal to inverter U5d switches from low to high to also generate a high at the output of inverter U5e. Now transistor Q8 is switched into conduction and thereby provides a signal to the chiller control. It will be further noted that the output of inverter U5e connects through a diode CR8 to the emitter of transistor Q6. So long as the output of inverter U5e remains low, a ground path is provided for transistor Q6 through the output of inverter of U5e. However, when the output of inverter U5e becomes high at termination of the voltage ramp, then further conduction of transistor Q6 is immediately prevented due to the sudden rapid rise in emitter voltage. It is this signal which terminates conduction of transistor Q6 and, hence, holds the voltage ramp at maximum potential.

Motor current sensing circuit 116 is shown at the left-hand portion of FIG. 3A. Circuit 116 develops at terminal A a signal whose magnitude is proportional to the magnitude of the largest current flowing in any of the three phase lines to compressor motor 96. In a balanced system, the line currents will be essentially equal in magnitude, and a motor overload will be indicated by excessive currents in all three lines. However, a phase unbalance can occasion an excessive current in only one line. With the present design, both these abnormal conditions will be detected. Therefore, three motor current transformers (not shown) are each operatively coupled with a corresponding one of the three-phase power lines to provide a corresponding A.C. signal as an input to an associated input transformer T1, T2 and T3. Specifically, input transformer T1 is coupled with the phase C motor current transformer, transformer T2 with the phase B; and transformer T3 with the phase A; phases A, B and C representing the three-phase power lines. Desirably, transformers T1, T2 and T3 are designed in accordance with known techniques to provide an output voltage as a function of input current. The secondaries of transformers T1, T2 and T3 are shunted respectively by resistors R5, R6 and R7 and are hence coupled through rectifying diodes CR2 thru CR7 to one side of a resistor R29. The other side of resistor R29 is connected to a pair of parallel capacitors C1 and C9. With this construction, the voltage developed across capacitors C1 and C9 is proportional to the largest phase current flowing to compressor motor 96, terminal A being at the junction of these two capacitors and resistor R29.

The overload protector is shown in the remainder of FIG. 3A and includes a NOR gate U6a functioning as run overload detector 120 and a NOR gate U6b functioning as start overload detector 122. A resistive network composed of a resistor R8, an overload adjust potentiometer P2, and resistor R32, R10 and R12 is connected as shown between motor current sensing circuit 116 and the two overload detectors 120, 122. This resistive network serves to establish the respective run and start overload reference signals. A fraction of the motor current signal appearing at terminal A is supplied via the wiper of potentiometer P2 across both resistors R10 and R12. The full magnitude of this fraction is supplied through a resistor R9 to an inverter U1c, however, because of the voltage dividing effect of resistors R10, R12, a lesser percentage is supplied through a resistor R11 to the input of another inverter U1d. The values of resistors R10 and R12 establish the respective run and start overload reference signal levels. In the illustrated embodiment resistors R10 and R12 are selected in a ratio of approximately nine to eleven respectively so that the signals applied to inverters U1C and U1d respectively are in the ratio of 200 to 110 percent respectively. By appropriate setting of potentiometer P2, the motor current signal appearing at terminal A is attenuated to scale the respective signals applied to inverters U1c and U1d in relation to the current rating of the compressor motor used in a given application. Since potentiometer P2 permits convenient adjustment of the magnitudes of the signals supplied to inverters U1c, U1d, the circuit may be readily calibrated for differently sized motors and/or to other start and run reference levels which bear the same ratio. In the present embodiment the scaling of potentiometer P2 is such that the input to inverter U1c remains low so long as the motor current drawn by the compressor motor does not exceed 110 percent of rated full-load current. Similarly, inverter U1d provides a high output signal so long as the motor current does not exceed 200 percent rated full-load current. However, should the motor current exceed the 110 percent full-load level, the output of inverter U1c switches from high to low and if the current exceeds the 200 percent level, the output of inverter U1d also switches from high to low. The output of inverter U1c is connected to one terminal of NOR gate U6a while the output of inverter U1d is connected to one input of NOR gate U6b. The outputs of these two NOR gates are connected to the inputs of a third NOR gate U6d c. Upon detection of an overload condition by either overload detector, the normally high output of NOR gate U6c switches from high to low.

The circuit also provides a feature whereby an overload is indicated in the event that one of the connections from potentiometer P2 is broken. This feature is provided by the connection of a resistor R8 and a solid state breakdown device Q1 between terminal A and resistor R9. In the event that one of the connections to potentiometer P2 opens for any reason while the compressor motor is running, a sufficient potential is developed across Q1 to permit current flow through resistor R8, device Q1 and resistors R10 and R12. The relative proportions of these three resistors and the breakdown potential of Q1 are such that signals indicative of an overload are supplied to inverters U1c, U1d.

As mentioned earlier, overload detection circuits 120 and 122 are coupled with timer circuit 124 whereby the start overload detector detects overloads exceeding a given level during motor starting and the run overload detector detects overloads of a different level during normal running of the motor. Timer circuit 124 comprises a counter U2 whose count input terminal is connected through a pulse shaping circuit to the secondary of transformer 106 via the terminal designated B. An example of a suitable device for counter U2 is Motorola Mc14040ACP. This pulse shaping circuit comprises resistors R3, R4, a diode CR1 and inverters U1a, U1b connected as illustrated. The circuit operates to produce pulses at the count terminal of counter U2 at a rate equal to the frequency of the A.C. supply line (60pulses per second as in the present embodiment). One output of counter U2 is connected in circuit to provide the start signal at terminal U2' after 16 pulses have been counted. Other outputs of counter U2 are coupled through a NAND gate U3a and an inverter U5a to provide at the output of the latter the run signal after 3,328 pulses have been counted. Hence, the start signal is given 16/60 second after counter U2 begins to count and the run signal is given approximately 55 seconds later. The start signal serves to set a start flip-flop composed of cross-coupled NOR gates U7a, U7b while the run signal serves to set a run flip-flop composed of cross-coupled NOR gates U4c, U4d. The former flip-flop, in turn, serves to gate start overload detector 120. Hence, neither overload detector is gated during the first 16/60 of a second during which counter U2 counts; start overload detector is gated during the next approximately 55 seconds; and thereafter run overload detector 120 is gated.

A transient suppression circuit consisting of a NOR gate U6d, a resistor R14, and a capacitor C11 is connected as illustrated with the output of NOR gate U6c. This circuit permits an output signal indicative of an overload condition to be supplied from the overload detectors to the overload detection latch circuit 126 only if an overload detector signal is given by either overload detector for a predetermined minimum time. For example, this may be on the order of milliseconds and serves the purpose of avoiding the generation of a spurious overload signal to latch 126 which might be occasioned by certain transients rather than true overload conditions. However, the delay is sufficiently short to avoid damage to the system if a true overload condition exists. Overload detection latch 126 consists of a pair of cross-coupled NOR gates U7c, U7d connected as a flip-flop and the output thereof is supplied to oscillator 128. When the signal from capacitor C11 goes high, the output from latch 126 also goes high thereby starting oscillator 128 and, in turn, shutting down the compressor motor.

A reset circuit is provided for the overload protector circuitry. The reset circuit serves to reset the system each time the compressor motor is re-started. The reset circuit includes a resistor R15 and a capacitor C8 connected as illustrated across the output of current sensing circuit 116 to provide U1e signal to an inverter U1f. An inverter U1e and a resistor R13 connect in a feedback loop between the output and input of inverter U1f to provide switching hysteresis. With this arrangement, the signal at the output of inverter U1f switches from high to low when motor current is being drawn by a compressor motor, the circuit being constructed to respond to a relatively small amount of motor current. The output of inverter U1f is connected via a reset line to the reset terminal of the overload detection latch flip-flop 126 as well as the reset terminals of the start and run flip-flops. Also, the output of inverter U1f is supplied to one input of a NOR gate U4b whose output is coupled through a NOR gate U4a to the reset terminal of counter U2.

When the output of inverter U1f switches from high to low upon starting of the compressor motor, the reset signal is given via the reset line to reset latch flip-flop 126 as well as the start and run flip-flops. With these flip-flops reset, oscillator 128 is shut off and neither the start nor run signal is given to the overload detector. The reset signal also removes the counter reset signal at the reset terminal of counter U2 thereby permitting timer circuit 124 to begin counting. When the start signal is given at terminal U2', the start flip-flop is switched from the reset to the set condition thereby providing the start signal to start overload detector 122. When the run signal is given at the output of inverter U5a, the run flip-flop is switched from a reset to a set condition thereby providing the run signal to run overload detector 120. Also, the setting of the run flip-flop supplied a signal via NOR gates U4a, U4b to shut down counter U2.

When an overload signal causes overload detection latch circuit 126 to switch from its reset to its set condition, the signal supplied to oscillator 128 goes high. Oscillator 128 comprises a circuit composed of resistors R16, R17, R18, R19, a capacitor C2, a transistor Q3, NAND GATES U3c, U3b and a transformer T4 connected as illustrated. When oscillator 128 is turned on by latch flip-flop 126 pulses are generated in the secondary of transformer T4. The secondary of transformer T4 is connected with a solid state switch 130 which takes the form of a triac Q2. Normally, triac Q2 is non-conductive but when pulses are supplied via transformer T4, the triac switches into conduction to complete a circuit between terminals designated C and D. The completion of this circuit energizes the shunt trip overload breaker 132 thereby causing the circuit from supply 101 to transformer 106 to open. In turn, this removes the power to ramp generator 110 and trigger circuits 114. Capacitor C5 gives the SCR static switches 104 a soft shut-off (reverse ramp).

What is claimed is:

1. A static starter and overload protector circuit for controlling the application of triggering pulses to solid state static switch means connected between a source of A.C. power and an A.C. motor, said circuit comprising:

a D.C. power supply;

means for energizing said D.C. power supply from an A.C. power supply;

a static starter circuit including a ramp generator circuit for generating a ramp signal in response to energization of said D.C. power supply;

means operatively coupled to said ramp generator circuit and responsive to the ramp signal thereof for controlling the application of said triggering pulses to said switch means so as to cause said motor to be accelerated to running speed as said ramp is generated;

sensing means for sensing motor current drawn by the motor to provide a motor current signal;

said ramp generator circuit including a voltage regulator, adapted to generate said ramp signal, whose output is a function of the impedance connected thereto, and a closed-loop de-generative feedback circuit via which the motor current signal is fed back to regulate the ramp signal in accordance with motor current drawn by the motor, said feedback circuit comprising a control circuit for controllably varying the impedance connected to the output of said voltage regulator in accordance with the motor current signal fed back to said ramp generator circuit; and an overload protector circuit operatively coupled to said sensing means to receive said motor current signal, said overload protector circuit including a start overload circuit for comparing said motor current signal with a start overload reference signal for a time interval sufficiently long to permit completion of the generation of the ramp under normal motor starting conditions and a run overload circuit for comparing said motor current signal with a run overload reference signal after said time interval, said overload protector circuit comprising output means for causing termination of said triggering pulses if the motor current signal exceeds the start overload reference signal during said time interval and thereafter if the motor current signal exceeds the run overload reference signal.

2. A static starter and overload protector circuit as claimed in claim 1 wherein said static starter circuit includes a time delay circuit connected to the output of said voltage regulator for time delaying the generation of the ramp signal for a comparatively short time period after said D.C. power supply is energized.

3. A static starter and overload protector circuit as claimed in claim 1 wherein said control circuit comprises a transistor whose conductivity is controlled by said motor current signal to in turn vary the impedance connected to the output of said voltage regulator.

4. A static starter and overload protector circuit as claimed in claim 3 wherein said static starter circuit includes a time delay circuit for preventing said control circuit from varying the impedance connected to the output of said voltage regulator during a comparatively short time period after said D.C. power supply is energized.

5. A static starter and overload protector circuit as claimed in claim 1 including means for disconnecting said A.C. power supply from said D.C. power supply comprising a circuit breaker operatively coupled with said A.C. power supply and wherein said overload protector circuit comprises a solid state switch operable in response to pulses applied thereto to trip said circuit breaker, said overload protector circuit further including an oscillator circuit connected with said solid state switch to provide pulses thereto to cause termination of said triggering pulses.

6. A static starter and overload protector circuit as claimed in claim 1 further including an electronic timer circuit for establishing said time interval.

7. A static starter and overload protector circuit as claimed in claim 6 wherein said overload protector circuit comprises a start logic circuit gate which is gated during said time interval and a run logic circuit gate which is gated after said time interval.

8. A static starter and overload protector circuit as claimed in claim 6 including a reset circuit for resetting said timer circuit in response to the initial occurrence of said motor current signal.

9. A static starter and overload protector circuit for controlling the application of triggering pulses to solid state switch means connected between a source of A.C. power and an A.C. motor, said circuit comprising:

a D.C. power supply;

means for energizing said D.C. power supply from an A.C. power supply;

a static starter circuit operable in response to energization of said D.C. supply for controlling the application of said triggering pulses to said switch means so as to cause said motor to be accelerated to running speed;

sensing means for sensing motor current drawn by the motor to provide a motor current signal; and an overload protector circuit operatively coupled with said sensing means to receive the motor current signal and operable in response to motor overloads to cause the termination of said triggering pulses to said switch means;

said overload protector circuit comprising, means establishing a start overload reference signal defining a motor overload for starting, means establishing a run overload reference signal defining a motor overload for running, a timer circuit defining a start timing interval, said timer circuit comprising a first bi-stable circuit which is in one of its states during said start timing interval and in the other of its states thereafter, said timer circuit further comprising a second bi-stable circuit which is in one of its states during said start timing interval and in the other of its states thereafter, a start logic gate which is gated by said first bi-stable circuit during said start timing interval to permit said motor current signal to be compared with said start overload reference signal during said start timing interval, a run logic gate which is gated by said second bi-stable circuit during after said start timing interval to permit said motor current signal to be compared with said run overload reference signal after said start timing interval, a third bi-stable circuit which is operatively coupled to said logic gates and which is switched from one of its states to the other of its states when the motor current signal exceeds the reference signal with which it is being compared; and means for causing termination of said triggering pulses in response to switching of said third bi-stable circuit from its one state to its other state.

* * * * *